United States Patent
Lee et al.

(10) Patent No.: US 6,385,443 B1
(45) Date of Patent: May 7, 2002

(54) INTERMEDIATE FREQUENCY LOCAL GENERATING CIRCUIT

(75) Inventors: Sang Jin Lee, Kyonggi-do; Ui Sik Kwak, Seoul; Jong Jin Kim, Taejon-Kwangyokshi, all of (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/431,965

(22) Filed: Nov. 1, 1999

(30) Foreign Application Priority Data

Dec. 17, 1998 (KR) .......................................... 98-55627

(51) Int. Cl.[7] .............................................. H04B 1/26
(52) U.S. Cl. ......................... 455/324; 455/59; 455/303
(58) Field of Search .......................... 455/324, 59, 314, 455/315, 260, 303; 375/376

(56) References Cited

U.S. PATENT DOCUMENTS

| | | | | |
|---|---|---|---|---|
| 5,428,836 A | * | 6/1995 | Sanecki et al. ............. | 455/315 |
| 5,761,615 A | * | 6/1998 | Janffee ....................... | 455/314 |
| 5,822,366 A | * | 10/1998 | Rapeli ........................ | 375/219 |
| 5,926,750 A | * | 7/1999 | Ishii ........................... | 455/130 |
| 5,949,830 A | * | 9/1999 | Nakanishi ................... | 375/334 |
| 5,953,643 A | * | 9/1999 | Speake et al. .............. | 455/324 |

* cited by examiner

*Primary Examiner*—Daniel Hunter
*Assistant Examiner*—Lana Le
(74) *Attorney, Agent, or Firm*—Fleshner & Kim, LLP

(57) ABSTRACT

An IF local generating circuit for a broadband communication system using a plurality of carriers is disclosed. In the present invention, one IF phase locked loop converts the IF signals to baseband signals by a downward processing of frequency in the receiving end of the broadband portable terminal.

16 Claims, 4 Drawing Sheets

INTERMEDIATE FREQUENCY LOCAL GENERATING CIRCUIT

BACKGROUND OF THE INVENTION

1. Field of the Invention

The present invention generally relates to a broadband communication system and more particularly to an intermediate frequency local generating circuit for generating an intermediate frequency local signal used in a broadband portable radio phone.

2. Description of the Related Art

Generally, a communication system using a multi-carrier receiving end converts a received radio frequency(RF) signal into a plurality of intermediate frequency signal. This system is based on an orthogonal frequency division multiplexing technique, and can overcome fading effects since symbol periods of the respective channels are lengthened. FIG. 1 is a block diagram illustrating a portion of the receiving end of a typical portable radio phone.

Referring to FIG. 1, in a multi-carrier communication system using N carriers, a radio frequency (RF) signal carried by the respective carrier is processed by a RF processing unit 1. A RF local generator 2 is provided in the receiving end of the terminal to convert the RF signal output from the RF processing unit 1. The RF signal output from the RF processing unit 1 and a RF local signal provided from the RF local generator 2 are mixed together to generate N intermediate frequency (IF) signals.

The N number of IF signals are processed by an IF processing unit 4, and these IF signals are then converted to baseband signals by first and second downward processing of the frequency. Particularly, to generate the N baseband signals from the N number of IF signals, the receiving end is provided with N IF local generators 5 which provide corresponding IF local signals through N paths. The IF signals output from the IF processing unit 4 and the IF local signals from the respective IF local generators 5 are mixed together to generate the baseband signals. Finally, the generated baseband signals are input to a baseband processing unlit for further processing.

As described above, the receiving end of the broadband portable radio phone using N carriers must employ a plurality of IF local generators equivalent to the number of the carriers, which increases the number of required components and increases the manufacturing cost of the circuit. Also, since a plurality of the local generators is required, the size of the circuit is increases which may cause unnecessary noise signals due to the increase of signal lines for connecting the local generators.

SUMMARY OF THE INVENTION

Accordingly, an object of the present invention is to solve at least the problems and disadvantages of the related art.

An object of the present invention is to simplify the circuit for the broadband portable radio phone using N carriers.

Another object of the present invention is to provide an intermediate frequency local generating circuit with one intermediate frequency phase locked loop to convert the intermediate frequency signals to the baseband signals.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the intermediate frequency local generating circuit includes an intermediate frequency phase locked loop for feeding back one of the plurality (N) of intermediate frequency local signals, comparing a frequency of the fed-back intermediate frequency local signal with a reference frequency of a portable radio phone, and outputting a pulse signal as a result of comparison; a loop filter for converting the pulse signal output from the intermediate frequency phase locked loop into a DC voltage; a plurality (N) of resonance circuits for receiving the DC voltage output from the loop filter, and outputting different resonance frequencies in accordance with values of their internal elements; and a plurality (N) of intermediate frequency voltage controlled oscillators for receiving the resonance frequencies from the plurality of resonance circuits, and producing the corresponding intermediate frequency local signals in accordance with the resonance frequencies inputted thereto.

The intermediate frequency local generating circuit includes a counter for dividing the frequency of the fed-back intermediate frequency local signal; and a phase comparator for comparing a phase of the frequency divided by the counter with that of the reference frequency. Also, the phase comparator outputs a phase difference signal as a result of phase comparison, and the intermediate frequency phase locked loop outputs the pulse signal having a pulse width corresponding to the phase difference.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 2:
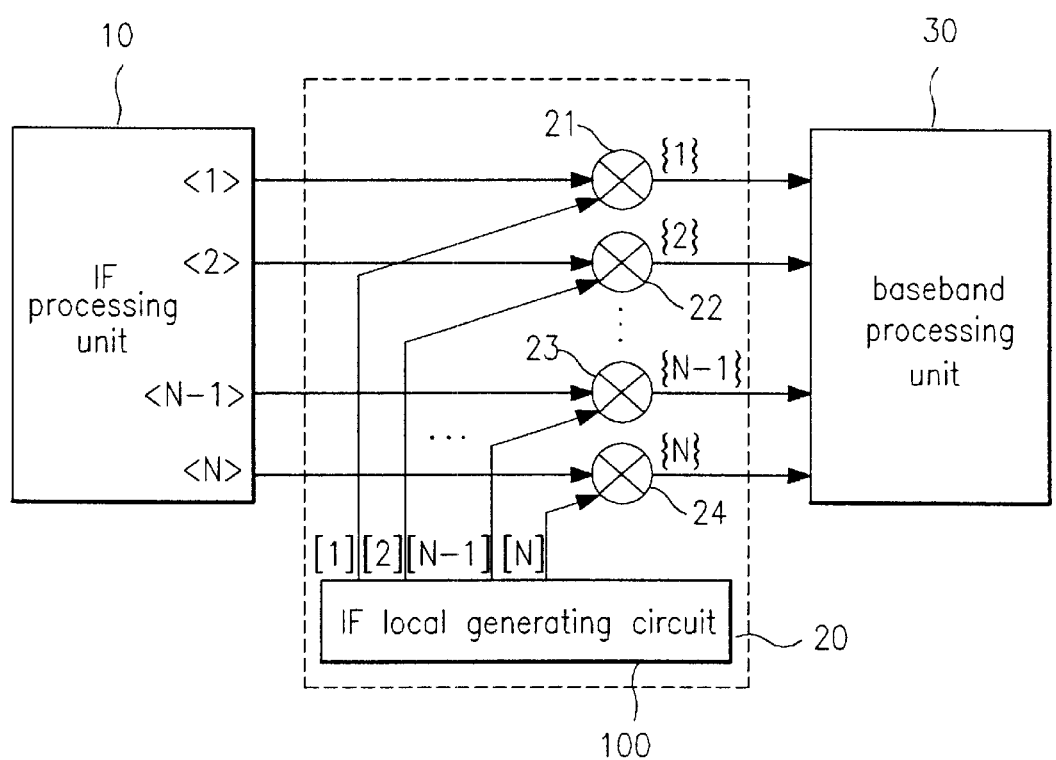
FIG. 2 is a block diagram illustrating a partial construction of a receiving end in a portable radio phone using a multi-carrier according to the present invention.

Reference will now be made in detail to the preferred embodiment of the present invention, examples of which are illustrated in the accompanying drawings. Generally, the IF local generating circuit is implemented by one IF phase locked loop rather than N IF local generators to converts the N number of IF signals into N number of baseband signals. FIG. 2 shows a partial construction of a receiving side of a broadband portable radio phone using a multi-carrier according to the present invention.

Figure 1:
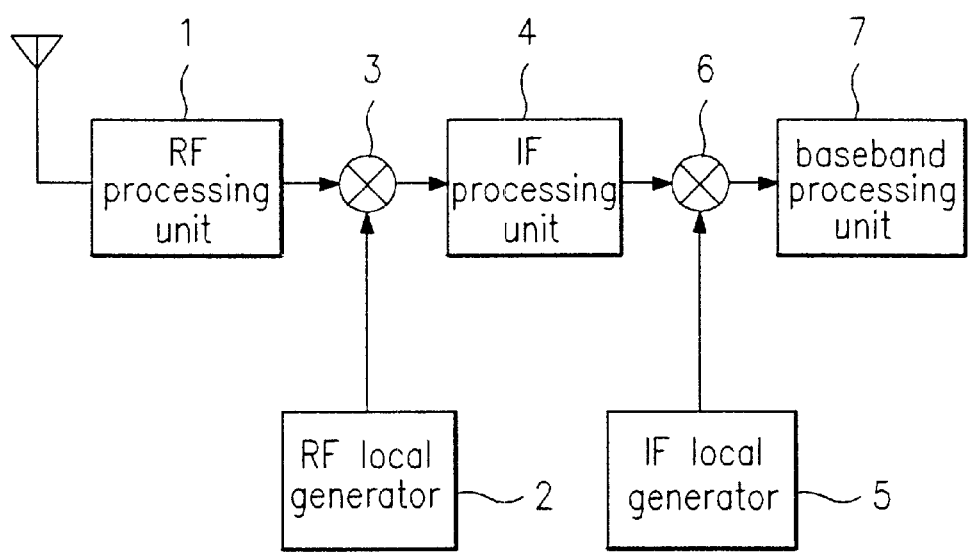
FIG. 1 is a block diagram illustrating a partial construction of a receiving end in a typical portable radio phone.
Figure 3:
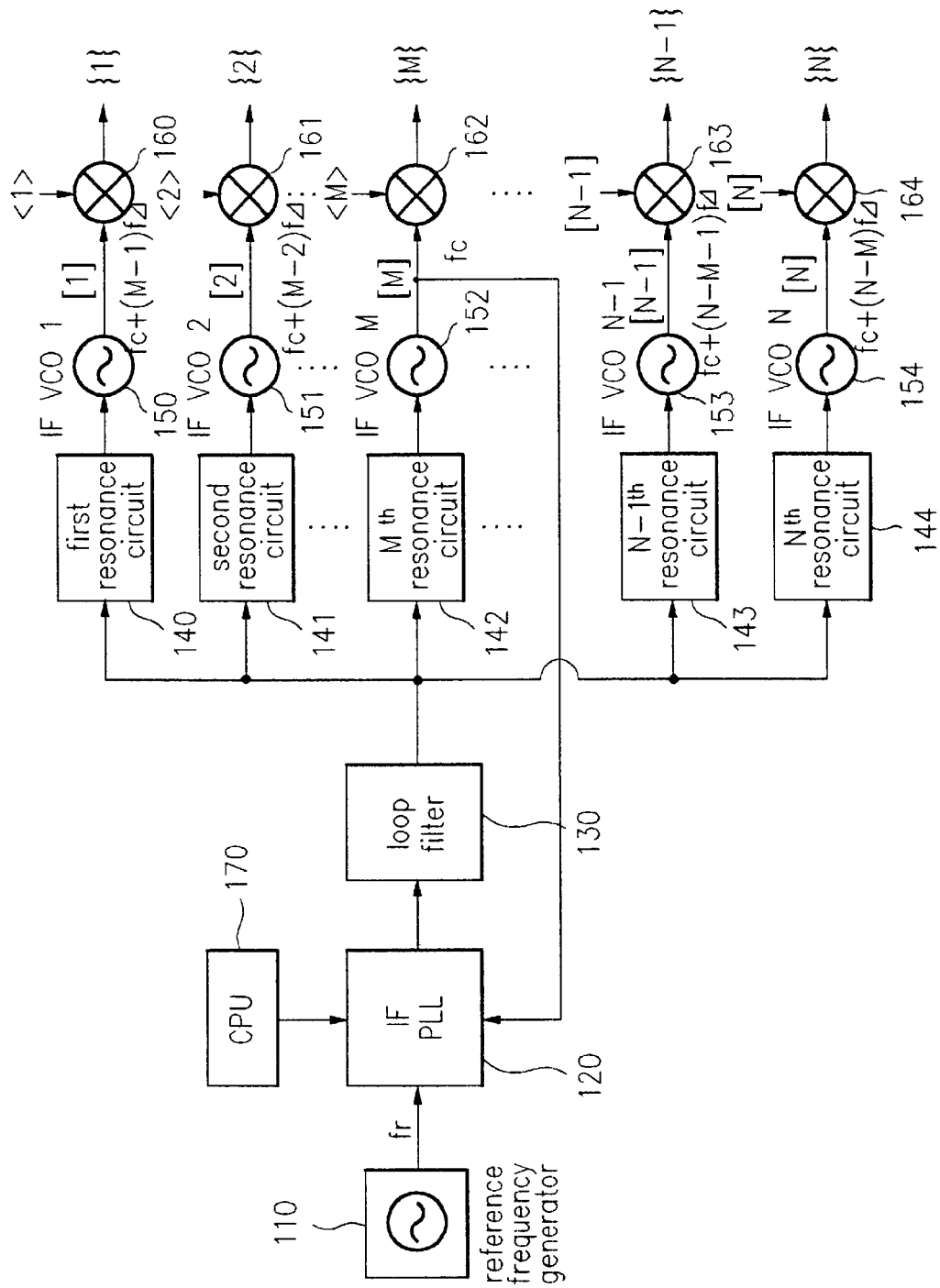
FIG. 3 is a block diagram of an intermediate frequency local generator according to the present invention.

Referring to FIG. 2, the IF signals output from an IF unit 10, pass through a plurality of paths 1~N as in the conventional circuit of FIG. 1. An IF local generating circuit 100 generates and outputs IF local signals required for making the baseband signals to a plurality of paths 1~N. The IF signals output from the IF processing section 10 and the IF local signals output from the IF local generating circuit 100 to the corresponding plurality of 1~N paths are mixed by IF mixers 21~24. The outputs of the IF mixers 21~24 are the baseband signals and are input to the baseband processing unit 30. As shown, the IF local generating circuit 100 outputs the IF local signals to a plurality of paths corresponding to the number of the carriers. FIG. 3 shows the construction of the IF local generating circuit according to the present invention.

Referring to FIG. 3, the IF local generating circuit 100 includes a reference frequency generator 110 generating a reference frequency $f_r$; an IF phase locked loop (IF PLL) 120; and a central processing unit (CPU) 170 providing data to the IF PLL 120. The IF local generating circuit 100 also includes a loop filter 130 converting a pulse width modulation voltage signal output by a charge pumping operation of the IF PLL 120 into a DC voltage signal; N IF voltage controlled oscillators (IF VCOs) 150~154 outputting IF local signals to the respective paths; and N resonance circuits 140~144 adjusting resonance frequencies such that the N number of IF VCOs 150~154 which receive the DC voltage output of the loop filter 130 can output the IF local signals to the IF mixers 21~24.

Particularly, the output of the loop filter 130 is input to the N resonance circuits 140~144 through the respective paths. The resonance circuits 140~144 have internal elements with differently adjusted values, and thus provide different resonance frequencies to the IF VCOs 150~154 connected to the corresponding paths of the resonance circuits 140~144. This enables the IF VCOs 150~154 to output IF local signals corresponding to the respective paths to the IF mixers 160~164.

In order to achieve the above process, the frequency $f_c$ of the output signal of the M-th IF VCO 152 is compared with the reference frequency $f_r$ to detect the phase difference between the two frequencies, and a constant DC voltage is applied to the respective resonance circuits 140~144 in accordance with the detected phase difference. Namely, the reference frequency $f_r$ generated and output by the IF PLL 120, and the frequency $f_c$ fed-back from the M-th IF VCO 152 and output to the IF PLL 120 are made identical utilizing data input from the CPU 170.

A counter (not illustrated) and a phase comparator (not illustrated) are provided in the IF PLL 120. The frequency $f_c$ of the signal fed-back from the M-th IF VCO 152 is divided by the counter, and the phase of the divided frequency is compared with that of the reference frequency $f_r$ output from the reference frequency generator 110 to detect the phase difference. The detected phase difference is output in the form of a pulse width modulation signal by the charge pump of the IF PLL 120. In other words, the phase difference is represented by the width of the pulse output from the IF PLL 120. The loop filter 130 then outputs a DC voltage corresponding to the pulse width of the pulse width modulation signal output from the IF PLL 120. The DC signal converted by the loop filter 130 is applied to the M-th resonance circuit 142 connected to the M-th path, and adjusts the resonance frequency of the M-th IF VCO 152 so that the M-th IF VCO 152 oscillates at a desired frequency $f_c$.

Unlike the RF local generating circuit having frequency which varies according to the frequency of the received radio frequency signal, the IF local generating circuit of the portable radio phone maintains a constant and fixed frequency as soon as the power of the portable radio phone is switched on. Accordingly, the M-th IF VCO 152 connected to the M-th path is adjusted so that it oscillates at a desired frequency $f_c$, and thus the DC voltage applied to the M-th resonance circuit 142 becomes constant. As a result, a constant DC voltage is applied to the first to N-th resonance circuits 140~144.

Figure 4:
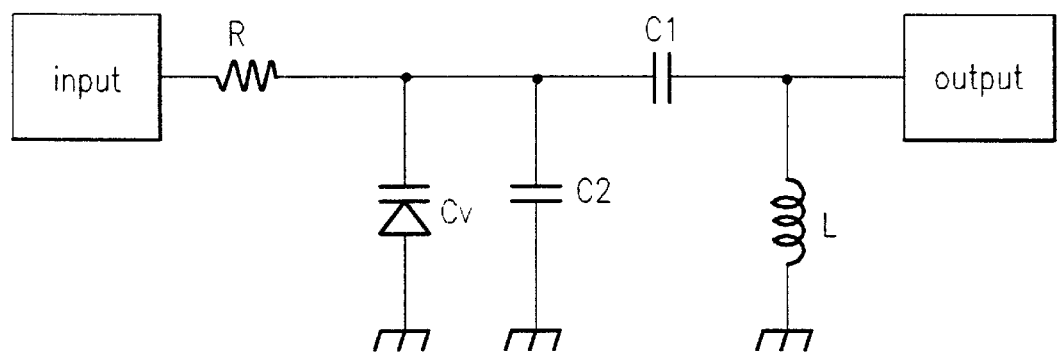
FIG. 4 is a schematic circuit diagram of a resonance circuit used in the present invention.

FIG. 4 shows the internal construction of the resonance circuit used in the present invention. By adjusting the values of a resistor R, an inductor L, capacitors C1 and C2, and varactor $C_V$, which are the internal elements of the resonance circuit, the N IF local signals for the respective carriers in the receiving end of the portable radio phone using N carriers can be adjusted so that the respective IF VCOs 150~154 oscillate at respectively desired frequencies.

As described above, the IF local generating circuit according to the present invention is implemented by one IF phase locked loop to convert the IF signals to baseband signals by a downward process of frequency in the receiving end of the broadband portable radio phone using the multi-carrier. As a result, the circuit construction of the portable radio phone can be significantly simplified and unnecessary noise from the signal lines can be reduced. Also, because the number of required circuit elements is reduced, the manufacturing cost and the size of the circuit can be greatly reduced.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A receiving end of a multi-carrier communication system using a plurality of carriers comprising:
   a IF processing unit processing and outputting IF signals to a first plurality of paths;
   an IF local generating circuit generating and outputting IF local signals to a second plurality of paths, wherein each of the IF local signals have different frequencies; and
   a plurality of mixers, each receiving and mixing one IF signal and one IF local signal through one of the first and second plurality of paths to generate a plurality of baseband signals, wherein the IF local generating circuit comprises:
      an IF phase locked loop receiving a generated IF local signal fed back from one of the second plurality of paths, comparing the frequency of the fed back IF local signal with a reference frequency, and outputting a pulse signal based upon the comparison;
      a loop filter converting the pulse signal output by the IF phase locked loop into a DC voltage signal;
      a plurality of resonance circuits receiving the DC voltage signal and outputting a plurality of resonance frequencies, wherein each resonance circuit outputs a different resonance frequency based upon an internal element value; and
      a plurality of IF voltage controlled oscillators, each generating an IF local signal utilizing a resonance frequency received from one of the plurality of resonance circuits, and outputting the generated IF local signal to one of the second plurality of paths.

2. A device of claim 1, further comprising a reference frequency generator generating the reference frequency.

3. A device of claim 1, wherein the IF phase locked loop comprises:
   a counter dividing the frequency of the fed-back IF local signal; and
   a phase comparator comparing a phase of the divided frequency divided with a phase of the reference frequency, and outputting a phase difference signal utilized in generating the pulse signal.

4. A device of claim 3, wherein the IF phase locked loop outputs the pulse signal having a pulse width corresponding to the phase difference signal.

5. A device of claim 4, wherein the loop filter outputs the DC voltage corresponding to the pulse width of the pulse signal output from the IF phase locked loop.

6. A device of claim 3, wherein the IF phase locked loop outputs the phase difference in the form of a pulse width modulation signal utilizing a charge pump.

7. A device of claim 1, further comprising:
- a RF processing unit processing RF signals carried by the plurality of carriers;
- a RF local generator converting the RF signal output from the RF processing unit and outputting RF local signals; and
- a RF local generator mixing the RF signal output from the RF processing unit and the RF local signals output from the RF local generator to generate N number of IF signals.

8. An IF local generating circuit of a multi-carrier communication system using a plurality of carriers comprising:
- an IF phase locked loop receiving a generated IF local signal fed back from one of the second plurality of paths, comparing the frequency of the fed back IF local signal with a reference frequency, and outputting a pulse signal based upon the comparison;
- a loop filter converting the pulse signal output by the IF phase locked loop into a DC voltage signal;
- a plurality of resonance circuits receiving the DC voltage signal and outputting a plurality of resonance frequencies, wherein each resonance circuit outputs a different resonance frequency based upon an internal element value; and
- a plurality of IF voltage controlled oscillators, each generating an IF local signal utilizing a resonance frequency received from one of the plurality of resonance circuits, and outputting the generated IF local signal to one of the second plurality of paths.

9. A device of claim 8, further comprising a reference frequency generator generating the reference frequency.

10. A device of claim 8, further comprising:
- a counter dividing the frequency of the fed-back IF local signal; and
- a phase comparator comparing a phase of the divided frequency divided with a phase of the reference frequency, and outputting a phase difference signal utilized in generating the pulse signal.

11. A device of claim 10, wherein the IF phase locked loop outputs the pulse signal having a pulse width corresponding to the phase difference signal.

12. A device of claim 11, wherein the loop filter outputs the DC voltage corresponding to the pulse width of the pulse signal output from the IF phase locked loop.

13. A device of claim 10, wherein the IF phase locked loop outputs the phase difference in the form of a pulse width modulation signal utilizing a charge pump.

14. A receiving end of a multi-carrier communication system using a plurality of carriers comprising:
- a IF processing unit processing and outputting IF signals to a first plurality of paths;
- an IF local generating circuit generating and outputting IF local signals to a second plurality of paths, wherein each of the IF local signals have different frequencies; and
- a plurality of mixers, each receiving and mixing one IF signal and one IF local signal through one of the first and second plurality of paths to generate a plurality of baseband signals,
- wherein the IF local generating circuit includes an IF phase locked loop receiving a generated IF local signal fed back from one of the second plurality of paths, comparing the frequency of the fed back IF local signal with a reference frequency.

15. The device of claim 14, wherein the IF phase locked loop outputs a pulse signal based upon the comparison, and the IF local generating circuit further comprises:
- a loop filter converting the pulse signal output by the IF phase locked loop into a DC voltage signal; and
- a plurality of resonance circuits receiving the DC voltage signal and outputting a plurality of resonance frequencies, wherein each resonance circuit outputs a different resonance frequency based upon an internal element value.

16. The device of claim 15, further comprising a plurality of IF voltage controlled oscillators, each generating an IF local signal utilizing a resonance frequency received from one of the plurality of resonance circuits, and outputting the generated IF local signal to one of the second plurality of paths.

* * * * *